(12) United States Patent
Huisman

(10) Patent No.: US 12,054,186 B1
(45) Date of Patent: Aug. 6, 2024

(54) HAND DOLLY WITH UNLOADING MECHANISM

(71) Applicant: Dean Huisman, Surrey (CA)

(72) Inventor: Dean Huisman, Surrey (CA)

( * ) Notice: Subject to any disclaimer, the term of this patent is extended or adjusted under 35 U.S.C. 154(b) by 0 days.

(21) Appl. No.: 18/088,860

(22) Filed: Dec. 27, 2022

(51) Int. Cl.
 *B62B 1/00* (2006.01)
 *B62B 1/14* (2006.01)

(52) U.S. Cl.
 CPC ................................ *B62B 1/145* (2013.01)

(58) Field of Classification Search
 CPC ........................ B62B 1/145; B62B 2203/72
 See application file for complete search history.

(56) References Cited

U.S. PATENT DOCUMENTS

| | | | | |
|---|---|---|---|---|
| 2,452,258 A | * | 10/1948 | Nielsen | B62B 1/145 |
| | | | | 414/490 |
| 3,112,042 A | * | 11/1963 | Leshner | B62B 1/145 |
| | | | | 280/654 |
| 3,403,800 A | * | 10/1968 | Botello | B62B 1/145 |
| | | | | 414/490 |
| 3,878,958 A | | 4/1975 | Ring | |
| 4,355,941 A | | 10/1982 | Lehman | |
| 5,256,025 A | | 10/1993 | Williamson | |
| 5,290,051 A | * | 3/1994 | Olson | B62B 1/145 |
| | | | | 414/490 |
| 5,971,693 A | * | 10/1999 | Story | B62B 1/145 |
| | | | | 414/490 |
| 6,227,789 B1 | | 5/2001 | Williamson | |
| 6,719,521 B1 | * | 4/2004 | Van Boxtel | B62B 1/145 |
| | | | | 414/490 |
| D644,395 S | | 8/2011 | Dechant | |
| 9,156,485 B1 | | 10/2015 | McLardy | |
| 2005/0121870 A1 | | 6/2005 | Wyse | |
| 2007/0200310 A1 | | 8/2007 | Dutro | |
| 2008/0284120 A1 | * | 11/2008 | Butler | B62B 1/145 |
| | | | | 280/47.17 |
| 2014/0265191 A1 | * | 9/2014 | Tseng | B62B 1/145 |
| | | | | 280/47.27 |

FOREIGN PATENT DOCUMENTS

WO 9405537 3/1994

* cited by examiner

*Primary Examiner* — Brian L Swenson
(74) *Attorney, Agent, or Firm* — Kyle A. Fletcher, Esq.

(57) ABSTRACT

The hand dolly with unloading mechanism comprises a hand dolly and an unloading mechanism. The hand dolly may be a manually-operated handcart that may be operable to move a payload. A base plate of the hand dolly may be pushed under the payload and the hand dolly may be tilted away from the payload such that a frame of the hand dolly and the base plate support the weight of the payload. The hand dolly may be pushed to move the payload, taking advantage of reduced friction offered by a pair of wheels on the hand dolly. The unloading mechanism may be a hand-operated mechanism for pushing the bottom of the payload off of the base plate.

17 Claims, 5 Drawing Sheets

HAND DOLLY WITH UNLOADING MECHANISM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hand dollies, more specifically, a hand dolly with an unloading mechanism.

SUMMARY OF INVENTION

The hand dolly with unloading mechanism comprises a hand dolly and an unloading mechanism. The hand dolly may be a manually-operated handcart that may be operable to move a payload. A base plate of the hand dolly may be pushed under the payload and the hand dolly may be tilted away from the payload such that a frame of the hand dolly and the base plate support the weight of the payload. The hand dolly may be pushed to move the payload, taking advantage of reduced friction offered by a pair of wheels on the hand dolly. The unloading mechanism may be a hand-operated mechanism for pushing the bottom of the payload off of the base plate.

An object of the invention is to provide a hand dolly for moving a payload.

Another object of the invention is to provide a frame, a base plate, an axle, and a pair of wheels for the hand dolly.

A further object of the invention is to provide an unloading mechanism pivotably coupled to the frame to push the payload off of a base plate of the hand dolly.

Yet another object of the invention is to provide a pivot bar, a vertical handle, and a pusher plate for the unloading mechanism.

These together with additional objects, features and advantages of the hand dolly with unloading mechanism will be readily apparent to those of ordinary skill in the art upon reading the following detailed description of the presently preferred, but nonetheless illustrative, embodiments when taken in conjunction with the accompanying drawings.

In this respect, before explaining the current embodiments of the hand dolly with unloading mechanism in detail, it is to be understood that the hand dolly with unloading mechanism is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hand dolly with unloading mechanism.

It is therefore important that the claims be regarded as including such equivalent construction insofar as they do not depart from the spirit and scope of the hand dolly with unloading mechanism. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
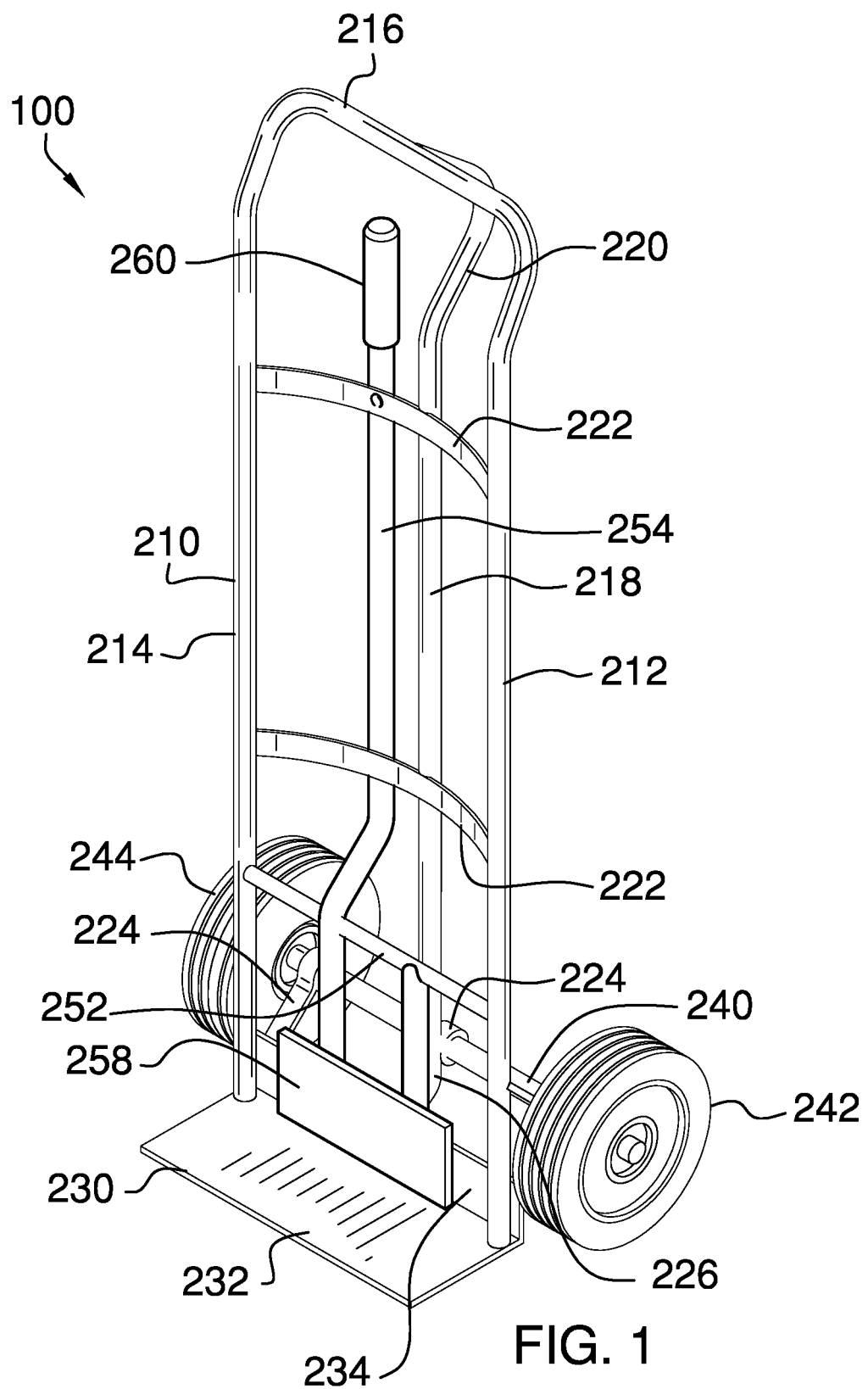
FIG. 1 is an isometric view of an embodiment of the disclosure.
Figure 2:
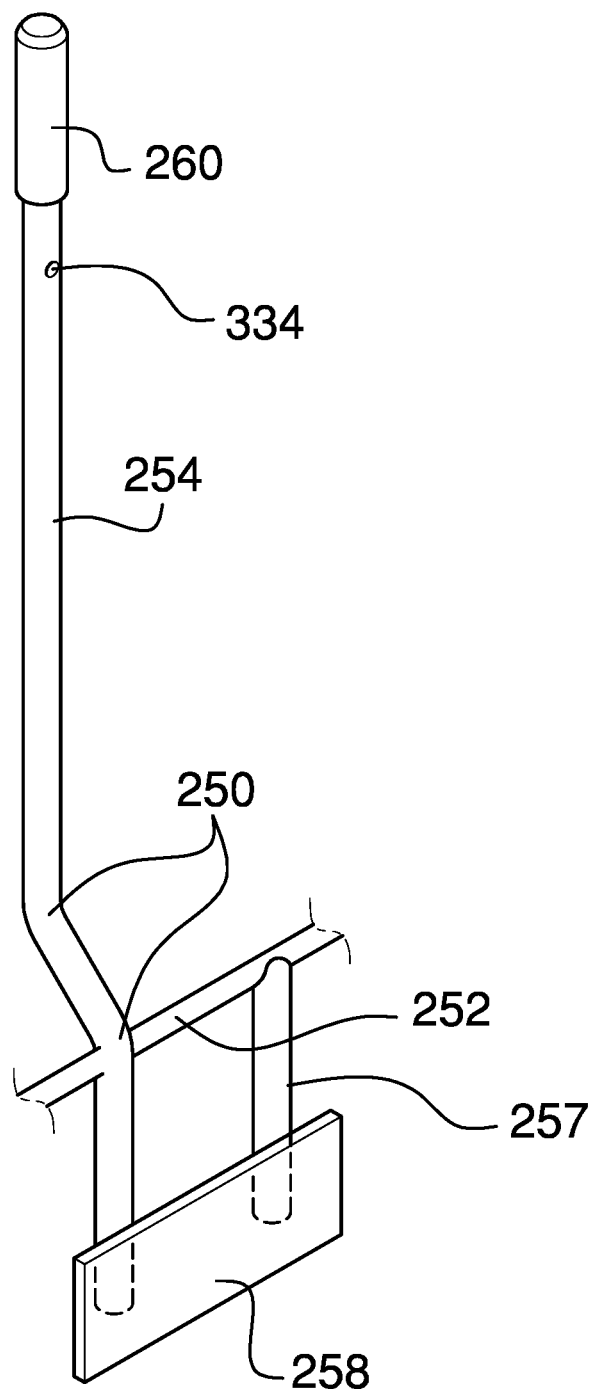
FIG. 2 is an isometric detail view of an embodiment of the disclosure illustrating the unloading mechanism.
Figure 3:
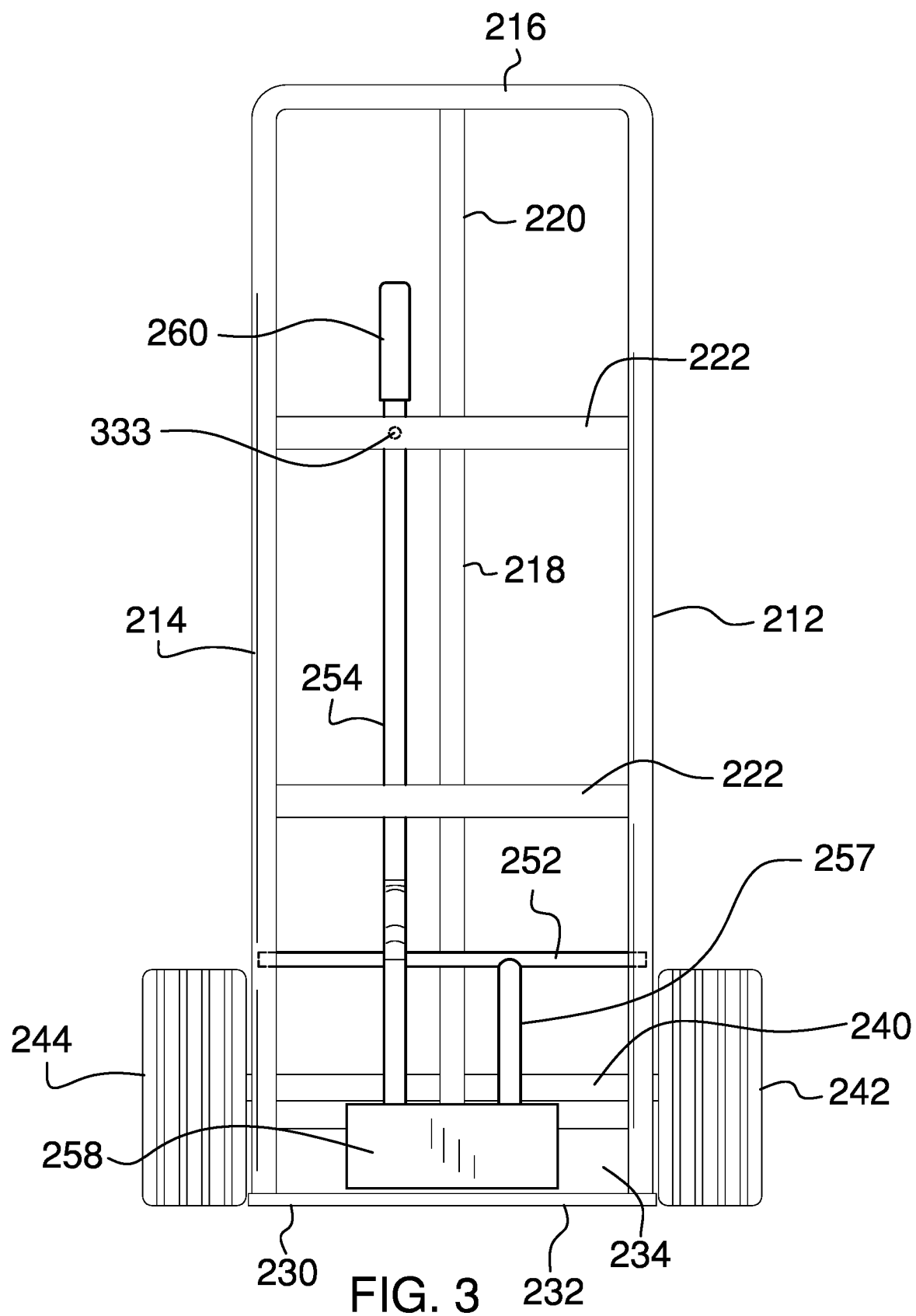
FIG. 3 is a front view of an embodiment of the disclosure.
Figure 4:
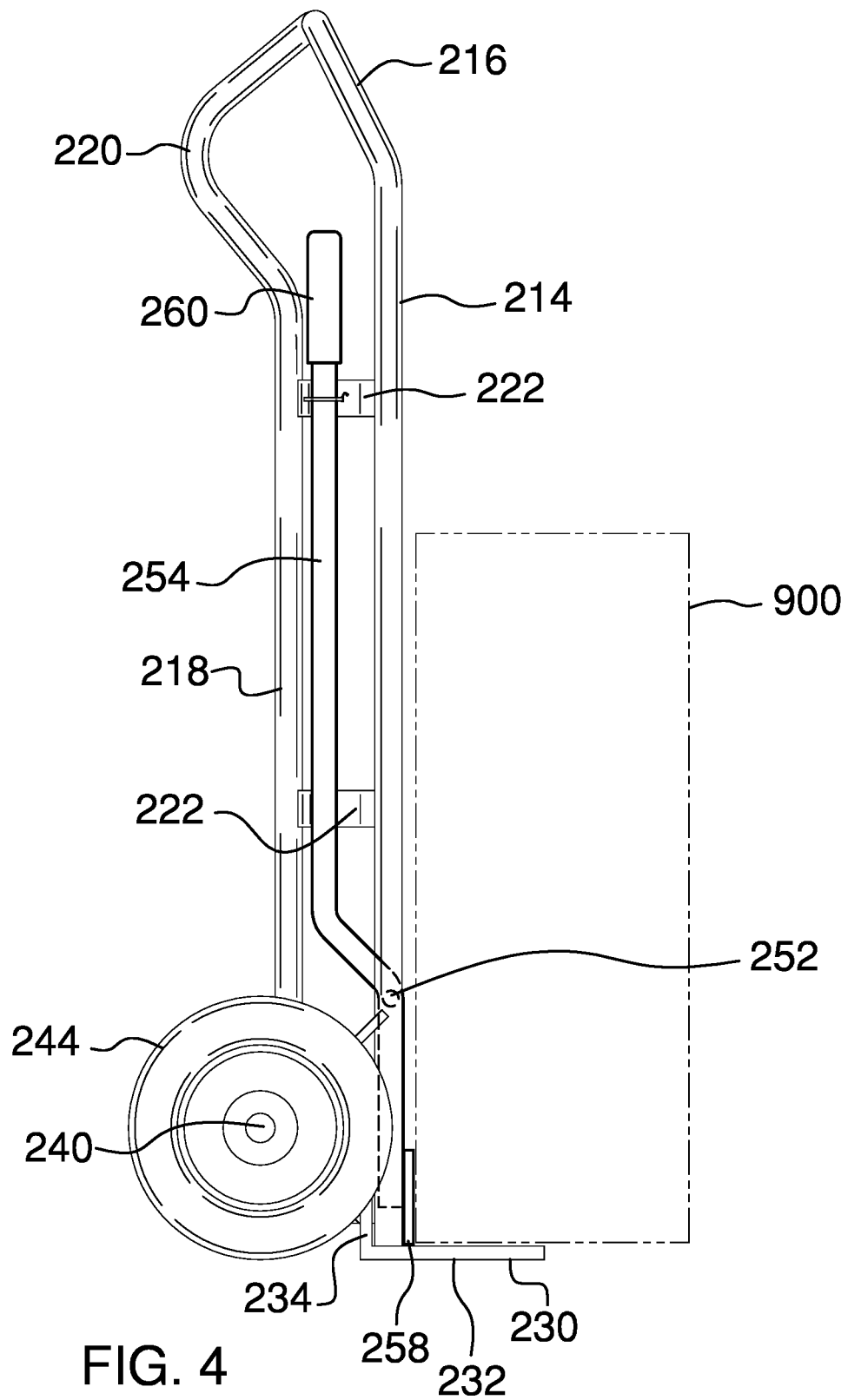
FIG. 4 is a side in-use view of an embodiment of the disclosure illustrating the unloading mechanism positioned to transport the payload.
Figure 5:
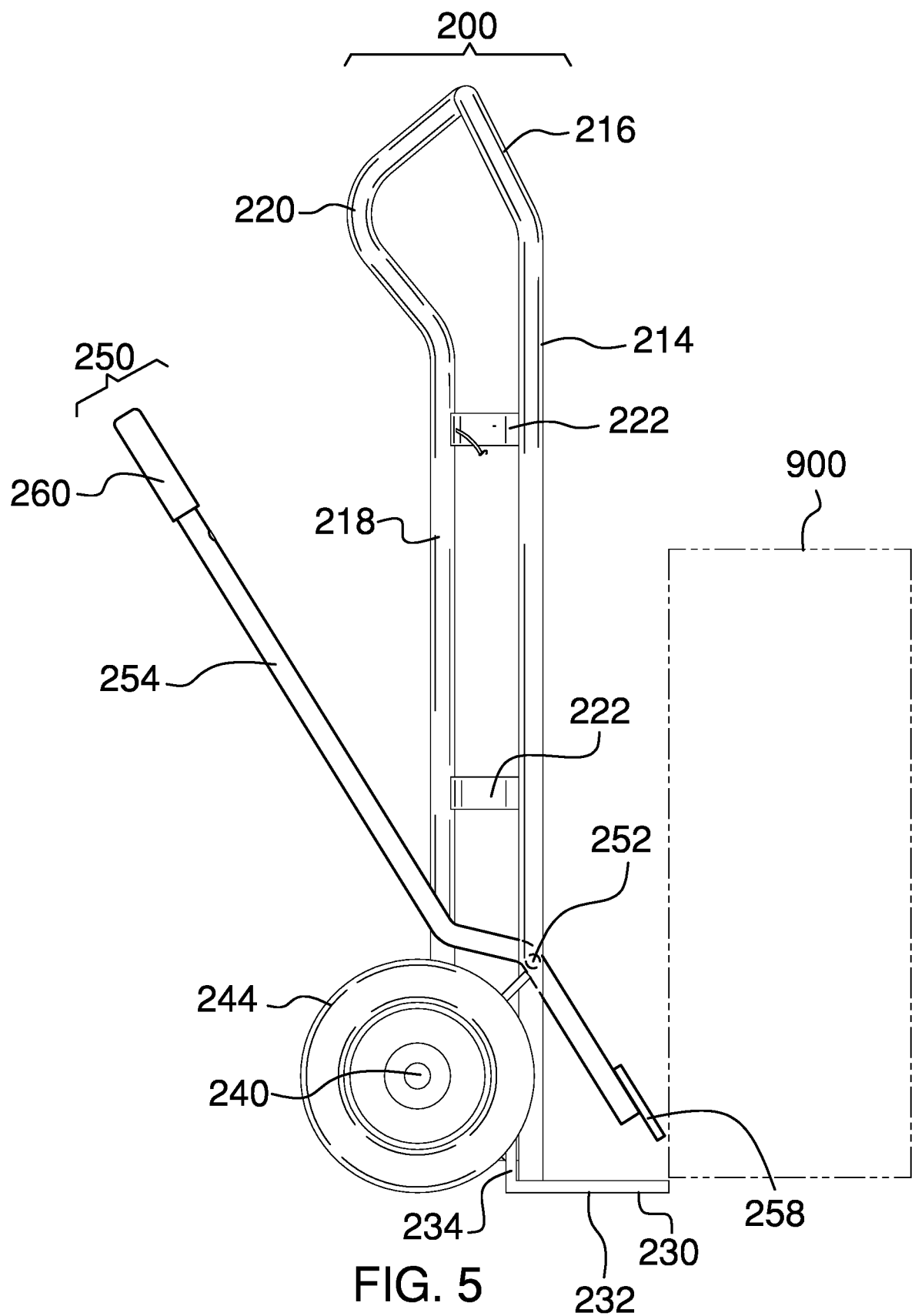
FIG. 5 is a side in-use view of an embodiment of the disclosure illustrating the unloading mechanism pushing the payload off of the base plate.

Detailed reference will now be made to a first potential embodiment of the disclosure, which is illustrated in FIGS. 1 through 5.

The hand dolly with unloading mechanism 100 (hereinafter invention) comprises a hand dolly 200 and an unloading mechanism 250. The hand dolly 200 may be a manually-operated handcart 8 that may be operable to move a payload 900. A base plate 230 of 9 the hand dolly 200 may be pushed under the payload 900 and the hand dolly 200 may be tilted away from the payload 900 such that a frame 210 of the hand dolly 200 and the base plate 230 support the weight of the payload 900. The hand dolly 200 may be pushed to move the payload 900, taking advantage of reduced friction offered by a pair of wheels on the hand dolly 200. The unloading mechanism 250 may be a hand-operated mechanism for pushing the bottom of the payload 900 off of the base plate 230.

The hand dolly 200 may comprise the frame 210, the base plate 230, an axle 240, a left wheel 242, and a right wheel 244. The frame 210 may support the weight of the payload 900 when the payload 900 is being moved. As non-limiting examples, the payload 900 may be a box, an appliance, or furniture.

The frame 210 may comprise a left side rail 212, a right side rail 214, and a top handlebar 216. The left side rail 212 and the right side rail 214 may be vertically-oriented armatures located on opposing sides of the frame 210. The bottoms of the left side rail 212 and the right side rail 214 may be coupled to the base plate 230. The top handlebar 216 may be a horizontally-oriented armature coupled to the tops of the left side rail 212 and the right side rail 214. The top handlebar 216 may be adapted for a user to grasp while pushing the hand dolly 200. In some embodiments, the top handlebar 216 may be offset rearward for easier access.

The frame 210 may further comprise a center rail 218. The center rail 218 may be a vertically-oriented armature located at the lateral center of the frame 210 and offset rearward from the left side rail 212 and the right side rail 214. The bottom of the center rail 218 may comprise a bottom bend 226 to bring the bottom of the center rail 218 forward such that the bottom of the center rail 218 may be coupled to the center of the base 19 plate 230.

The top of the center rail 218 may bend rearward and then forward to form a center handlebar 220. The center handlebar 220 may be adapted for the user to grasp when tilting and/or pushing the hand dolly 200. The top of the center rail 218 may be coupled to the center of the top handlebar 216.

In some embodiments, the left side rail 212, the right side rail 214, the top handlebar 216, the center rail 218, the center handlebar 220, or any combination thereof may be made of hollow metal tubing.

The frame 210 may further comprise one or more cross braces 222. The one or more cross braces 222 may be horizontally-oriented bowed armatures that are coupled on one end to the left side rail 212 and on the opposite end to the right side rail 214. The centers of the one or more cross braces 222 may be coupled to the center rail 218.

The frame 210 may further comprise a wheel frame 224 for supporting the axle 240. The wheel frame 224 may comprise rearward projecting armatures and annular rings to rotationally couple the axle 240 to the frame 210.

The base plate 230 may be a forward extending ledge located at the bottom of the hand dolly 200. The base plate 230 may be operable to slide under the payload 900 and to lift the payload 900 as the hand dolly 200 is tilted rearwards. The base plate 230 may be an L-shape comprising a horizontal plate 232 and a vertical plate 234. The horizontal plate 232 may be larger than the vertical plate 234 and may be operable to slide under the payload 900. The vertical plate 234 may be located at the rear of the horizontal plate 232 and may extend vertically upwards. The left side rail 212, the right side rail 214, and the center rail 218 may be coupled to the vertical plate 234.

The axle 240 may be a shaft extending laterally across the frame 210. The left wheel 242 may be rotationally coupled to the left end of the axle 240 and the right wheel 244 may be rotationally coupled to the right end of the axle 240. The axle 240 may be supported by the wheel frame 224. The length of the axle 240 may be wider than the lateral width of the frame 210 such that the left wheel 242 and the right wheel 244 are positioned to the left of the frame 210 and to the right of the frame 210, respectively. The height of the axle 240 above the ground may be such that the left wheel 242, the right wheel 244, and the base plate 230 touch the ground when the hand dolly 200 is in an upright position and the base plate 230 is lifted above the ground when the hand dolly 200 is tilted back onto the left wheel 242 and the right wheel 244.

The unloading mechanism 250 may be a hand-operated lever for pushing the payload 900 off of the base plate 230 when the hand dolly 200 is in the upright position. The unloading mechanism 250 may comprise a pivot bar 252, a vertical handle 254, a pusher plate 258, and a second bar 257.

The pivot bar 252 may be pivotably coupled to the left side rail 212 and to the right side rail 214. The pivot bar 252 may 8 pivot when the unloading mechanism 250 is actuated by pulling the top of the vertical handle 254 rearwards such that the pusher plate 258 may move forward. The second bar 257 works in concert with the vertical handle 254. The second bar 257, like the vertical handle 254, is affixed to and perpendicular with 13 the pivot bar 252. The second bar 257 is parallel with the 14 vertical handle 254.

The vertical handle 254 may be a vertically-oriented armature that may be coupled to the pivot bar 252. The vertical handle 254 may be coupled to the pivot bar 252 to the right of the center rail 218 or to the left of the center rail 218 such that the center rail 218 does not interfere with operation of the unloading mechanism 250. The vertical handle 254 may comprise one or more bends 256 that form a parallel offset to the rear to position the upper portion of the vertical handle 254 rearwards of the one or more cross braces 222 such that the one or more cross braces 222 do not interfere with operation of the unloading mechanism 250.

The pusher plate 258 may be a vertically-oriented plate coupled to the bottom of the vertical handle 254. The pusher plate 258 may be positioned such that a normal vector extending from the pusher plate 258 points forward. When the top of the vertical handle 254 is pulled rearwards the pivot bar 252 may pivot and the pusher plate 258 may move forward, pushing the payload 900 off of the base plate 230.

In some embodiments, the top of the vertical handle 254 may comprise a hand grip 260. The hand grip 260 may be adapted for the user to grasp while actuating the unloading mechanism 250. The one or more cross braces 222 may include a first magnet 333 that aligns with a second magnet 334 provided on the vertical handle 254. The first magnet 333 and the second magnet 334 secure the vertical handle 254 against the one or more cross braces 222 when the vertical handle 254 is not in use.

In use, the hand dolly 200 may be pushed towards the payload 900 such that the base plate 230 slides under the payload 900 and the payload 900 presses against the left side rail 212 and the right side rail 214. The hand dolly 200 may be tilted to the rear such that the payload 900 is lifted from the ground and is supported by the left side rail 212, the right side rail 214, and the base plate 230. The hand dolly 200 may be rolled on the left wheel 242 and the right wheel 244 by pushing or pulling the top handlebar 216 and/or the center handlebar 220. To unload the payload 900, the hand dolly 200 may be pivot to an upright position and the unloading mechanism 250 may be actuated to push the payload 900 off of the base plate 230. The unloading mechanism 250 may be actuated by pulling the top of the vertical handle 254 rearwards while holding the hand dolly 200 stationary. As non-limiting examples, the hand dolly 200 may be held stationary by bracing a foot against the axle 240 or a wheel, by holding the top handlebar 216 and/or the center handlebar 220 with one or both hands, or any combination thereof.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "axle" may be a cylindrical shaft or rod that is inserted through the center of an object such that the center axis of the object and the center axis of the axle are aligned and the object can rotate using the axle as an axis of rotation.

As used herein, the words "couple", "couples", "coupled" or "coupling", may refer to connecting, either directly or indirectly, and does not necessarily imply a mechanical connection.

As used in this disclosure, a "dolly" may refer to a mobile platform, generally mounted on one or more rollers, wheels, or casters, that is used to move a load or an object. A dolly may also be referred to as a "hand dolly", "hand truck", or "hand trolley".

As used herein, "front" may indicate the side of an object that is closest to a forward direction of travel under normal use of the object or the side or part of an object that normally presents itself to view or that is normally used first. "Rear" or "back" may refer to the side that is opposite the front.

Unless noted otherwise, "ground" may refer to any surface which may support items and individuals. As non-limiting examples, ground may refer to an earthen surface whether covered by vegetation or not, a floor, a tarmac, a driveway, a road, a deck, bedrock, or a stage. The phrase "from the ground" may refer to performing an activity while standing on such a surface as opposed to climbing a ladder.

As used herein, "grip" may refer to a covering that is placed over a hand hold, handle, shaft, or other object.

As used herein, "handle" may refer to an object by which a tool, object, or door is held or manipulated with the hand.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the word "lateral" may refer to the sides of an object or movement towards a side. Lateral directions are generally perpendicular to longitudinal directions. "Laterally" may refer to movement in a lateral direction.

As used in this disclosure, a "lever" may be a simple machine that comprises a shaft or armature that rotates around a fulcrum or pivot point.

As used herein, the word "pivot" may include any mechanical arrangement that allows for rotational motion. Non-limiting examples of pivots may include hinges, holes, posts, dowels, pins, points, rods, shafts, balls, and sockets, either individually or in combination.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, "vertical" may refer to a direction that is parallel to the local force of gravity. Unless specifically noted in this disclosure, the vertical direction is always perpendicular to horizontal.

As used in this disclosure, a "wheel" may be a circular object that revolves around an axle or an axis and is fixed below an object to enable it to move easily over the ground.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A hand dolly with unloading mechanism comprising:
a hand dolly and an unloading mechanism;
wherein the hand dolly is a manually-operated handcart that is operable to move a payload;
wherein a base plate of the hand dolly is pushed under the payload and the hand dolly is tilted away from the payload such that a frame of the hand dolly and the base plate support the weight of the payload;
wherein the hand dolly is pushed to move the payload, taking advantage of reduced friction offered by a pair of wheels on the hand dolly;
wherein the unloading mechanism is a hand-operated mechanism for pushing the bottom of the payload off of the base plate;
wherein the frame comprises a left side rail, a right side rail, and a top handlebar;
wherein the left side rail and the right side rail are vertically-oriented armatures located on opposing sides of the frame;
wherein the bottoms of the left side rail and the right side rail are coupled to the base plate;
wherein the top handlebar is a horizontally-oriented armature coupled to the tops of the left side rail and the right side rail;
wherein the top handlebar is adapted for a user to grasp while pushing the hand dolly;
wherein the base plate is a forward extending ledge located at a bottom of the hand dolly;
wherein the base plate is operable to slide under the payload and to lift the payload as the hand dolly is tilted rearwards;
wherein the base plate is an L-shape comprising a horizontal plate and a vertical plate;
wherein the horizontal plate is larger than the vertical plate and is operable to slide under the payload;
wherein the vertical plate is located at a rear of the horizontal plate and extends vertically upwards;
wherein the left side rail, the right side rail, and the center rail are coupled to the vertical plate.

2. The hand dolly with unloading mechanism according to claim 1
wherein the hand dolly comprises the frame, the base plate, an axle, a left wheel, and a right wheel;

wherein the frame supports the weight of the payload when the payload is being moved.

3. The hand dolly with unloading mechanism according to claim 1
wherein the top handlebar is offset rearward for easier access.

4. The hand dolly with unloading mechanism according to claim 1
wherein the frame further comprises a center rail;
wherein the center rail is a vertically-oriented armature located at the lateral center of the frame and offset rearward from the left side rail and the right side rail;
wherein the bottom of the center rail comprises a bottom bend to bring the bottom of the center rail forward such that the bottom of the center rail is coupled to the center of the base plate.

5. The hand dolly with unloading mechanism according to claim 4
wherein the top of the center rail bends rearward and then forward to form a center handlebar;
wherein the center handlebar is adapted for the user to grasp when tilting and/or pushing the hand dolly;
wherein the top of the center rail is coupled to the center of the top handlebar.

6. The hand dolly with unloading mechanism according to claim 5
wherein the left side rail, the right side rail, the top handlebar, the center rail, the center handlebar, or any combination thereof are made of hollow metal tubing.

7. The hand dolly with unloading mechanism according to claim 5
wherein the frame further comprises one or more cross braces;
wherein the one or more cross braces are horizontally-oriented bowed armatures that are coupled on one end to the left side rail and on the opposite end to the right side rail;
wherein the centers of the one or more cross braces are coupled to the center rail.

8. The hand dolly with unloading mechanism according to claim 7
wherein the frame further comprises a wheel frame for supporting the axle;
wherein the wheel frame comprises rearward projecting armatures and annular rings to rotationally couple the axle to the frame.

9. The hand dolly with unloading mechanism according to claim 8
wherein the axle is a shaft extending laterally across the frame;
wherein the left wheel is rotationally coupled to the left end of the axle and the right wheel is rotationally coupled to the right end of the axle;
wherein the axle is supported by the wheel frame.

10. The hand dolly with unloading mechanism according to claim 9
wherein the length of the axle is wider than the lateral width of the frame such that the left wheel and the right wheel are positioned to the left of the frame and to the right of the frame, respectively.

11. The hand dolly with unloading mechanism according to claim 10
wherein the height of the axle above the ground is such that the left wheel, the right wheel, and the base plate touch the ground when the hand dolly is in an upright position and the base plate is lifted above the ground when the hand dolly is tilted back onto the left wheel and the right wheel.

12. The hand dolly with unloading mechanism according to claim 11
wherein the unloading mechanism is a hand-operated lever for pushing the payload off of the base plate when the hand dolly is in the upright position;
wherein the unloading mechanism comprises a pivot bar, a vertical handle, a pusher plate, and a second bar.

13. The hand dolly with unloading mechanism according to claim 12
wherein the pivot bar is pivotably coupled to the left side rail and to the right side rail;
wherein the pivot bar pivots when the unloading mechanism is actuated by pulling the top of the vertical handle rearwards such that the pusher plate moves forward.

14. The hand dolly with unloading mechanism according to claim 13
wherein the vertical handle is a vertically-oriented armature that is coupled to the pivot bar;
wherein the vertical handle is coupled to the pivot bar to the right of the center rail or to the left of the center rail such that the center rail does not interfere with operation of the unloading mechanism.

15. The hand dolly with unloading mechanism according to claim 14
wherein the vertical handle comprises one or more bends that form a parallel offset to the rear to position the upper portion of the vertical handle rearwards of the one or more cross braces such that the one or more cross braces do not interfere with operation of the unloading mechanism;
wherein the second bar works in concert with the vertical handle;
wherein the second bar and the vertical handle are parallel with one another;
wherein the second bar and the vertical handle are affixed to the pivot bar;
wherein the second bar and the vertical handle are perpendicular with respect to the pivot bar.

16. The hand dolly with unloading mechanism according to claim 15
wherein the pusher plate is a vertically-oriented plate coupled to the bottom of the vertical handle;
wherein the pusher plate is positioned such that a normal vector extending from the pusher plate points forward;
wherein when the top of the vertical handle is pulled rearwards the pivot bar pivots and the pusher plate moves forward, pushing the payload off of the base plate.

17. The hand dolly with unloading mechanism according to claim 16
wherein the top of the vertical handle comprises a hand grip;
wherein the hand grip is adapted for the user to grasp while actuating the unloading mechanism;
wherein the one or more cross braces includes a first magnet that aligns with a second magnet provided on the vertical handle;
wherein the first magnet and the second magnet secure the vertical handle against the one or more cross braces when the vertical handle is not in use.

* * * * *